United States Patent
Chiu et al.

(10) Patent No.: US 9,929,635 B2
(45) Date of Patent: Mar. 27, 2018

(54) LEAKAGE CURRENT SUPPRESSION CIRCUIT AND AC-TO-DC POWER SUPPLY INCORPORATING THE SAME

(71) Applicants: LITE-ON ELECTRONICS (GUANGZHOU) LIMITED, Guangzhou (CN); LITE-ON TECHNOLOGY CORP., Taipei (TW)

(72) Inventors: I-Chao Chiu, New Taipei (TW); Yeh Guan, New Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 45 days.

(21) Appl. No.: 14/988,091

(22) Filed: Jan. 5, 2016

(65) Prior Publication Data

US 2016/0315551 A1    Oct. 27, 2016

(30) Foreign Application Priority Data

Apr. 24, 2015    (CN) .......................... 2015 1 0202641

(51) Int. Cl.
| | |
|---|---|
| H02J 1/02 | (2006.01) |
| H02M 1/12 | (2006.01) |
| H02M 1/44 | (2007.01) |
| H02M 3/28 | (2006.01) |
| H02M 7/04 | (2006.01) |
| H02M 1/00 | (2006.01) |

(52) U.S. Cl.
CPC ............. *H02M 1/12* (2013.01); *H02M 1/126* (2013.01); *H02M 1/44* (2013.01); *H02M 3/28* (2013.01); *H02M 7/04* (2013.01); *H02M 2001/007* (2013.01)

(58) Field of Classification Search
CPC ............ H02M 1/10; H02M 1/14; H02M 1/15; H02M 1/126
USPC ............................ 363/39, 44, 45, 46, 47, 48
See application file for complete search history.

(56) References Cited

U.S. PATENT DOCUMENTS 5,499,178 A * 3/1996 Mohan ...................... H02J 3/01
 307/105
6,239,995 B1 * 5/2001 Weng ................... H02M 1/4216
 363/37

* cited by examiner

*Primary Examiner* — Nguyen Tran
(74) *Attorney, Agent, or Firm* — Rosenberg, Klein & Lee

(57) ABSTRACT

A leakage current suppression circuit is adapted for use with an AC-to-DC power supply that includes a bridge rectifier converting an AC input voltage into a DC voltage and outputting the DC voltage through a first output terminal and a grounded second output terminal thereof, a DC-to-DC converter converting the DC voltage into a predetermined DC output voltage and outputting the DC output voltage through a first output end and a grounded second output end thereof, and a capacitor coupled to the second output terminal of the bridge rectifier at one terminal thereof. The leakage current suppression circuit includes a first impedance unit and a second impedance unit each coupled in parallel between the other terminal of the capacitor and ground.

8 Claims, 6 Drawing Sheets

LEAKAGE CURRENT SUPPRESSION CIRCUIT AND AC-TO-DC POWER SUPPLY INCORPORATING THE SAME

CROSS-REFERENCE TO RELATED APPLICATION

This application claims priority to Chinese Application No. 201510202641.X, filed on Apr. 24, 2015, the contents of which are hereby incorporated by reference.

FIELD

The disclosure relates to suppression of leakage current, and more particularly to a leakage current suppression circuit and an AC-to-DC power supply incorporating the same.

BACKGROUND

In recent years, there has been a trend toward miniaturization of electronic products. However, under the precondition of increased power intensity, the component density of a miniaturized electronic product is increased, and the circuit layout thereof becomes denser, thereby incurring electromagnetic interference (EMI) among electronic components thereof. On the other hand, electromagnetic waves produced by the miniaturized electronic product may interfere with other electronic equipments and may even be harmful to human health. In order to solve such EMI problem, many countries regulate the levels of EMI emissions that are allowed to emanate from electronic products, and require testing of such electronic products to verify compliance with the regulations before releasing the products to the market.

FIG. 1 illustrates a conventional AC-to-DC power supply 9 that includes an input unit 91, a bridge rectifier 92 and a DC-to-DC converter 93. The input unit 91 includes a first input end ($P_1$) and a second input end ($P_2$) that are cooperatively used to receive an AC input voltage, and a grounded end ($P_3$). The bridge rectifier 92 has two input terminals coupled respectively to the first and second input ends ($P_1$, $P_2$), and two output terminals ($P_4$, $P_5$) coupled to the DC-to-DC converter 93. The output terminal ($P_5$) is grounded. The bridge rectifier 92 receives the AC input voltage from the first and second input ends ($P_1$, $P_2$) through the input terminals, converts the AC input voltage into a DC voltage, and outputs the DC voltage to the DC-to-DC converter 93 through the output terminals ($P_4$, $P_5$). The DC-to-DC converter 93 converts the DC voltage from the bridge rectifier 92 into a predetermined DC output voltage, and outputs the predetermined DC output voltage through two output ends ($P_6$, $P_7$) thereof. The output end ($P_7$) is grounded. In this case, the output ends ($P_6$, $P_7$) cooperatively constitute an output end unit 94 for outputting the predetermined DC output voltage. Furthermore, a Y-type capacitor ($C_y$) is used to suppress electromagnetic interference. The Y-type capacitor ($C_y$) has one end coupled electrically to the output terminal ($P_5$) of the bridge rectifier 92, and has another end coupled electrically to the output ends ($P_7$) of the DC-to-DC converter 93 and the grounded end ($P_3$) of the input unit 91.

In such a configuration, the larger the capacitance of the Y-type capacitor ($C_y$), the greater the effect of electromagnetic interference suppression. However, a high-frequency isolation transformer included in the DC-to-DC converter 93 may result in a leakage current that increases with increase of the capacitance of the Y-type capacitor ($C_y$). Therefore, even though electromagnetic interference is suppressed, such AC-to-DC power supply 9 may not meet the standards associated with the leakage current.

SUMMARY

Therefore, an object of the disclosure is to provide a leakage current suppression circuit and an AC-to-DC power supply incorporating the same that can overcome the aforesaid drawbacks of the prior art.

According to one aspect of the disclosure, there is provided a leakage current suppression circuit for an AC-to-DC power supply. The AC-to-DC power supply includes an input unit, a bridge rectifier, a DC-to-DC converter and a capacitor. The input unit includes a first input end and a second input end cooperatively receiving an AC input voltage, and a grounded third end. The bridge rectifier is coupled to the first and second input ends of the input unit for receiving the AC input voltage therefrom, converts the AC input voltage into a DC voltage, and outputs the DC voltage through a first output terminal and a grounded second output terminal thereof. The DC-to-DC converter is coupled to the first and second output terminals of the bridge rectifier for receiving the DC voltage from the bridge rectifier, converts the DC voltage into a predetermined DC output voltage, and outputs the predetermined DC output voltage through a first output end and a grounded second output end thereof. The capacitor has two terminals, one of which is coupled to the second output terminal of the bridge rectifier. The leakage current suppression circuit includes:

a first impedance unit to be coupled between the other of the terminals of the capacitor and the third end of the input unit; and a second impedance unit to be coupled between the other of the terminals of the capacitor and the second output end of the DC-to-DC converter.

According to another aspect of this disclosure, an AC-to-DC power supply includes:

an input unit including a first input end and a second input end that are cooperatively used to receive an AC input voltage, and a grounded third end;

a bridge rectifier having a first input terminal and a second input terminal that are coupled respectively to the first and second input ends of the input unit for receiving the AC input voltage therefrom, a first output terminal and a grounded second output terminal, the bridge rectifier converting the AC input voltage into a DC voltage and outputting the DC voltage through the first and second output terminals;

a DC-to-DC converter coupled to the first and second output terminals of the bridge rectifier for receiving the DC voltage from the bridge rectifier, the DC-to DC converter having a first output end and a grounded second output end, converting the DC voltage into a predetermined DC output voltage, and outputting the predetermined DC output voltage through the first and second output ends;

a capacitor having two terminals, one of which is coupled to the second output terminal of the bridge rectifier; and a leakage current suppression circuit including
a first impedance unit coupled between the other of the terminals of the capacitor and the third end of the input unit, and
a second impedance unit coupled between the other of the terminals of the capacitor and the second output end of the DC-to-DC converter.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
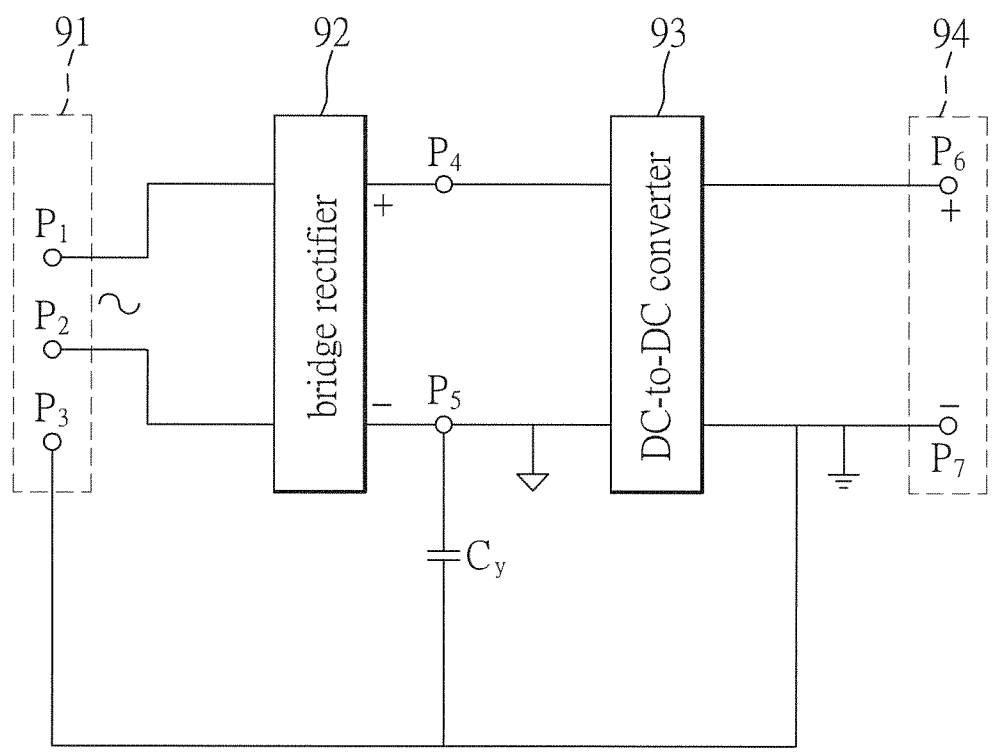
FIG. 1 is a schematic circuit block diagram illustrating a conventional AC-to-DC power supply.

Before describing the disclosure in greater detail, it should be noted herein that like elements are denoted by the same reference numerals throughout this disclosure. In addition, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 2:
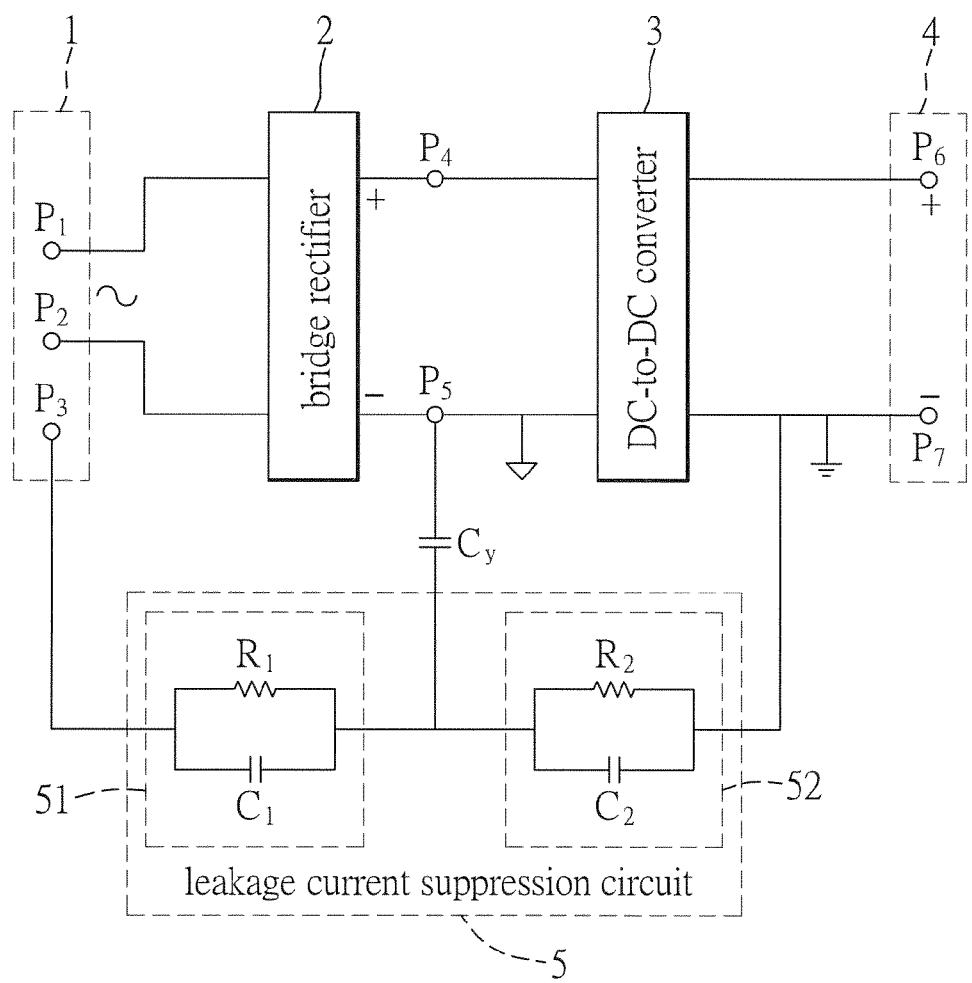
FIG. 2 is a schematic circuit block diagram illustrating the first embodiment of an AC-to-DC power supply according to the disclosure.

Referring to FIG. 2, the first embodiment of an AC-to-DC power supply 10 according to this disclosure is shown to include an input unit 1, a bridge rectifier 2, a DC-to-DC converter 3, a capacitor ($C_y$) and a leakage current suppression circuit 5.

The input unit 1 includes a first input end ($P_1$) and a second input end ($P_2$) that are cooperatively used to receive an AC input voltage, and a grounded third end ($P_3$).

The bridge rectifier 2 has a first input terminal and a second input terminal that are coupled respectively to the first and second input ends ($P_1$, $P_2$) of the input unit 1 for receiving the AC input voltage therefrom, a first output terminal ($P_4$), and a grounded second output terminal ($P_5$). The bridge rectifier 2 converts the AC input voltage into a DC voltage, and outputs the DC voltage through the first and second output terminals ($P_4$, $P_5$).

The DC-to-DC converter 3 is coupled to the first and second output terminals ($P_4$, $P_5$) of the bridge rectifier 2 for receiving the DC voltage from the bridge rectifier 2. The DC-to-DC converter 3 has a first output end ($P_6$), and a grounded second output end ($P_7$) that cooperates with the first output end ($P_6$) to constitute an output unit 4 of the AC-to-DC power supply 10. The DC-to-DC converter 3 converts the DC voltage into a predetermined DC output voltage, and outputs the predetermined DC output voltage through the first and second output ends ($P_6$, $P_7$).

The capacitor ($C_y$) has two terminals, one of which is coupled to the second output terminal ($P_5$) of the bridge rectifier 2. In this embodiment, the capacitor ($C_y$) is a Y-type capacitor.

The leakage current suppression circuit 5 includes a first impedance unit 51 and a second impedance unit 52. The first impedance unit 51 is coupled between the other terminal of the capacitor ($C_y$) and the third end ($P_3$) of the input unit 1. The second impedance unit 52 is coupled between the other terminal of the capacitor ($C_y$) and the second output end ($P_7$) of the DC-to-DC converter 3. In this embodiment, the first impedance unit 51 includes a parallel connection of a resistor ($R_1$) and a capacitor ($C_1$), and has an impedance ($Z_1$). The second impedance unit 52 includes a parallel connection of a resistor ($R_2$) and a capacitor ($C_2$), and has an impedance ($Z_2$) greater than the impedance ($Z_1$) of the first impedance unit 51.

In such a configuration, since the DC-to-DC converter 3 may include a high-frequency isolation transformer (not shown), the capacitor ($C_y$) may become a primary factor to affect a leakage current from the AC-to-DC power supply 10. In this case, the leakage current suppression circuit 5 is operative to effectively suppress the leakage current.

Figure 3:
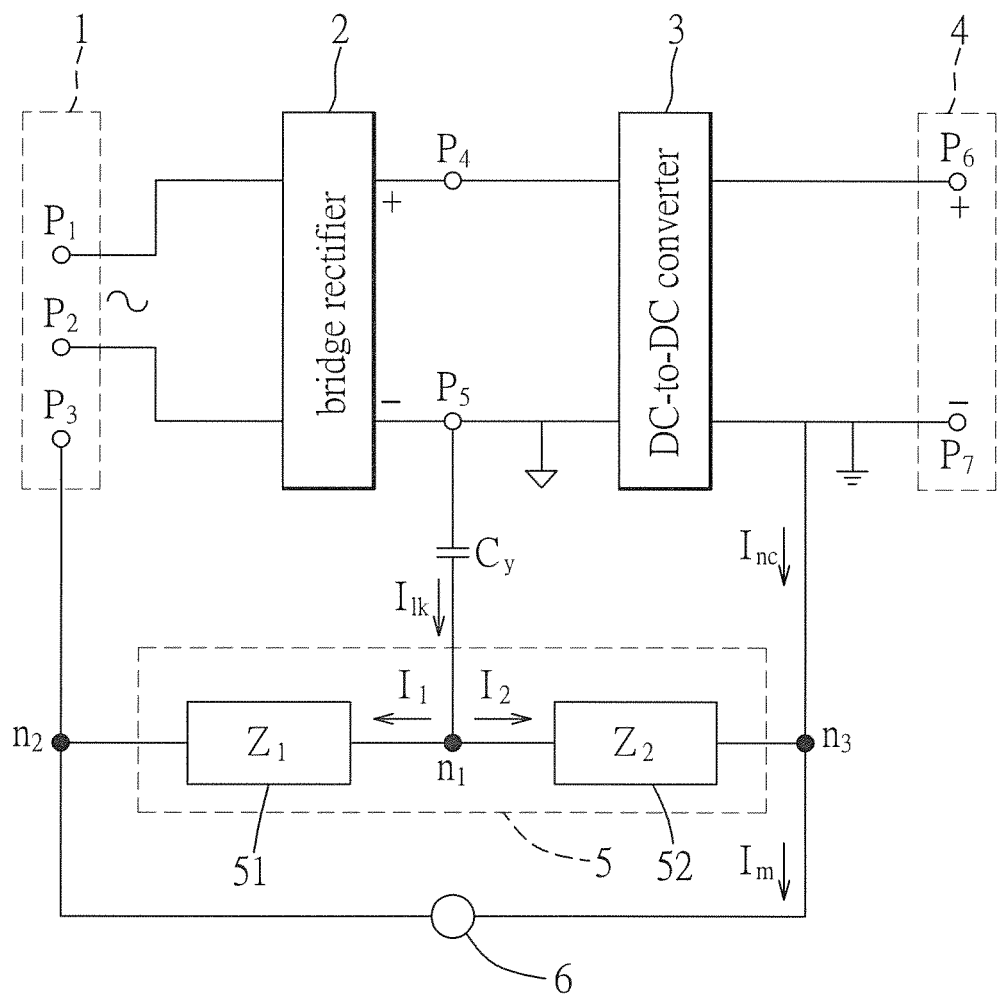
FIG. 3 is a schematic circuit block diagram illustrating how a current measuring device measures a leakage current from the first embodiment.

Referring to FIG. 3, a current measuring device 6, such as a current meter, is used for leakage current measurement of the AC-to-DC power supply 10. In a standard measurement for leakage current, the current measuring device 6 is coupled between a common node (n2), which is between the third end ($P_3$) and the first impedance unit 51, and a common node (n3), which is between the second impedance unit 52 and the second output end ($P_7$) of the DC-to-DC converter 3. Thus, a measured current ($I_m$) flowing through and measured by the current measuring device 6 can represent a total leakage current from the AC-to-DC power supply 10.

Referring to FIG. 3, for example, when a leakage current ($I_{lk}$) from the capacitor ($C_y$) flows into a common node (n1) among the first and second impedance units 51, 52 and the capacitor ($C_y$), the leakage current ($I_{lk}$) may be split into a first current component ($I_1$) flowing through the first impedance unit 51 and a second current component ($I_2$) flowing through the second impedance unit 52. Therefore, according to Kirchhoff's current law, the relationships among the leakage current ($I_{lk}$), the first and second current components ($I_1$, $I_2$), and the impedances ($Z_1$, $Z_2$) of the first and second impedance units 51, 52 can be represented by the following equations (1), (2) and (3):

$$I_{lk} = I_1 + I_2 \qquad \text{equation (1)}$$

$$I_1 = I_k \cdot \frac{Z_2}{Z_1 + Z_2} \qquad \text{equation (2)}$$

$$I_2 = I_{lk} \cdot \frac{Z_1}{Z_1 + Z_2} \qquad \text{equation (3)}$$

On the other hand, another leakage current ($I_{nc}$) from the second output end ($P_7$) of the DC-to-DC converter 3 may flow into the common node (n3). Therefore, according to Kirchhoff's current law, the relationship among the measured leakage current ($I_m$), the leakage current ($I_{nc}$) and the second current component ($I_2$) can be represented by the following equation (4):

$$I_m = I_{nc} + I_2 \qquad \text{equation (4)}$$

From equation (4), when the second current component ($I_2$) decreases, the measured leakage current ($I_m$) measured by the current measuring device 6 decreases accordingly. Therefore, in accordance with equation (3), suppression of the measured leakage current ($I_m$) can be achieved by appropriately determining the impedances ($Z_1$, $Z_2$). That is to say, the larger the ratio of the impedance ($Z_2$) to the impedance ($Z_1$), the smaller the second current component ($I_2$), and the better the suppression efficiency for the measured leakage current ($I_m$).

For example, if $Z_2/Z_1=2$, $Z_1=10$ kΩ and $Z_2=20$ kΩ, equation (3) is represented as follows:

$$I_2 = I_{lk} \cdot \frac{Z_1}{Z_1 + Z_2} = I_{lk} \cdot \frac{10k}{10k + 20k} = \frac{1}{3}I_{lk} \cong 0.33 I_{lk}$$

In this example, about 67 percent of the leakage current ($I_{lk}$) can be suppressed in the measured leakage current ($I_m$).

As another example, if $Z_2/Z_1=20$, $Z_1=10$ kΩ and $Z_2=200$ kΩ, equation (3) is represented as follows:

$$I_2 = I_{lk} \cdot \frac{Z_1}{Z_1 + Z_2} = I_{lk} \cdot \frac{10k}{10k + 200k} = \frac{1}{21}I_{lk} \cong 0.05 I_{lk}$$

In this example, about 95 percent of the leakage current ($I_{lk}$) can be suppressed in the measured leakage current ($I_m$).

Therefore, the following Table 1 exemplarily shows the relationships between the ratio of the impedance ($Z_2$) to the impedance ($Z_1$), and suppression efficiency for the measured leakage current ($I_m$).

TABLE 1

| $Z_2/Z_1$ | Suppression efficiency for $I_m$ (%) |
| --- | --- |
| 2 | 65 |
| 3 | 72 |
| 5.6 | 82 |
| 7.5 | 85 |
| 10 | 88 |
| 20 | 93 |

It is noted that, as shown in Table 2 below, without the leakage current suppression circuit 5, capacitance of the Y-type capacitor ($C_y$) may be only increased to about 470 pF in order to comply with the general upper-limit leakage current criterion of 50 μA. However, due to the presence of the leakage current suppression circuit 5, the measured leakage current ($I_m$) may be decreased to about 20 μA. That is to say, about 50 percent to about 90 percent of the measured leakage current ($I_m$) may be suppressed. In addition, the capacitance of the Y-type capacitor ($C_y$) may be increased from about 470 pF up to 2200 pF for the same upper-limit leakage current criterion of 50 μA. Therefore, electromagnetic interference suppression of the AC-to-DC power supply can be improved, and the choice of the Y-type capacitor ($C_y$) is more flexible so as to comply with various requirements for electromagnetic interference suppression. The following Table 2 exemplarily shows the relationships between the capacitance of the Y-type capacitor ($C_y$) and the measured leakage current ($I_m$) under conditions of the presence and absence of the leakage current suppression circuit 5.

TABLE 2

| | $I_m$ (μA) | |
| --- | --- | --- |
| Capacitance of $C_y$ (pF) | without leakage current suppression circuit | with leakage current suppression circuit |
| 470 | 45 | 20 |
| 1000 | 85 | 20 |
| 1500 | 115 | 20 |
| 2200 | 180 | 20 |

Figure 4:
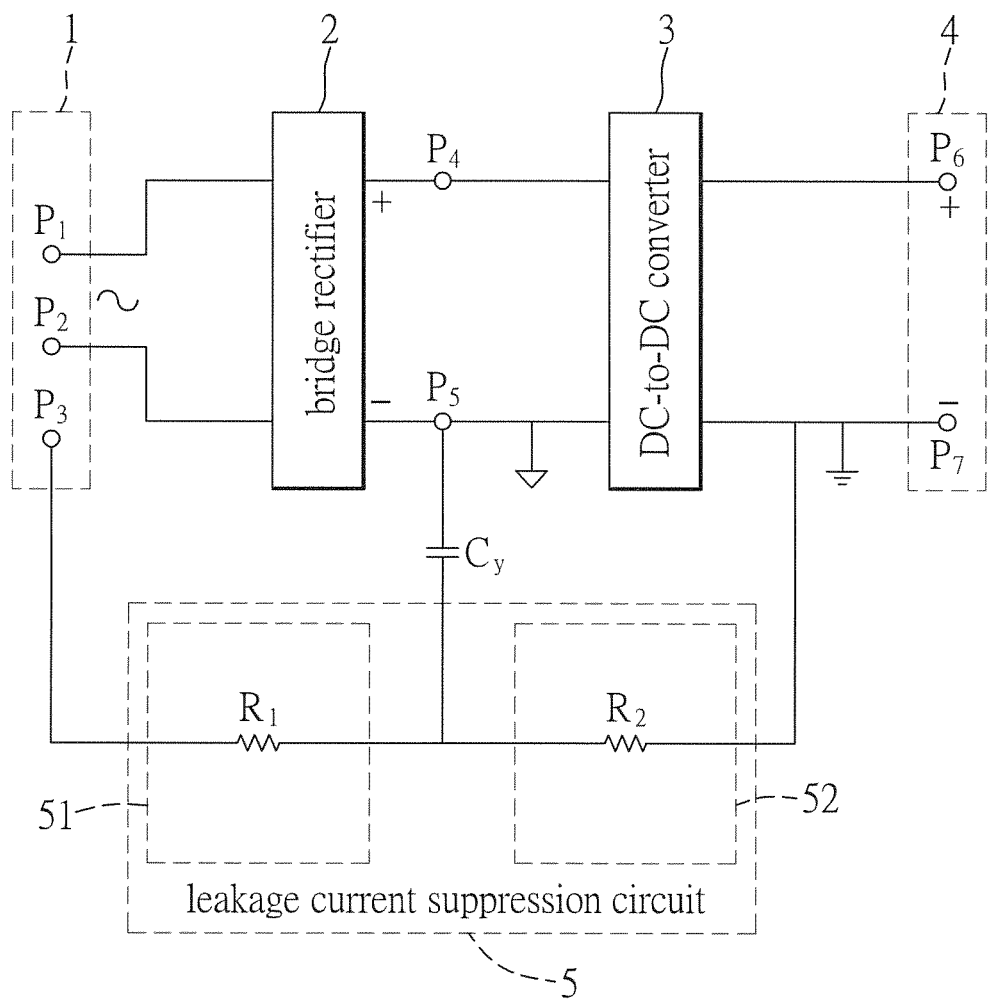
FIG. 4 is a schematic circuit block diagram illustrating the second embodiment of an AC-to-DC power supply according to the disclosure.

FIG. 4 illustrates the second embodiment of an AC-to-DC power supply 10 according to this disclosure, which is a modification of the first embodiment. Unlike the previous embodiment, the first impedance unit 51 has only one resistor ($R_1$), and the second impedance unit 52 has only one resistor ($R_2$).

Figure 5:
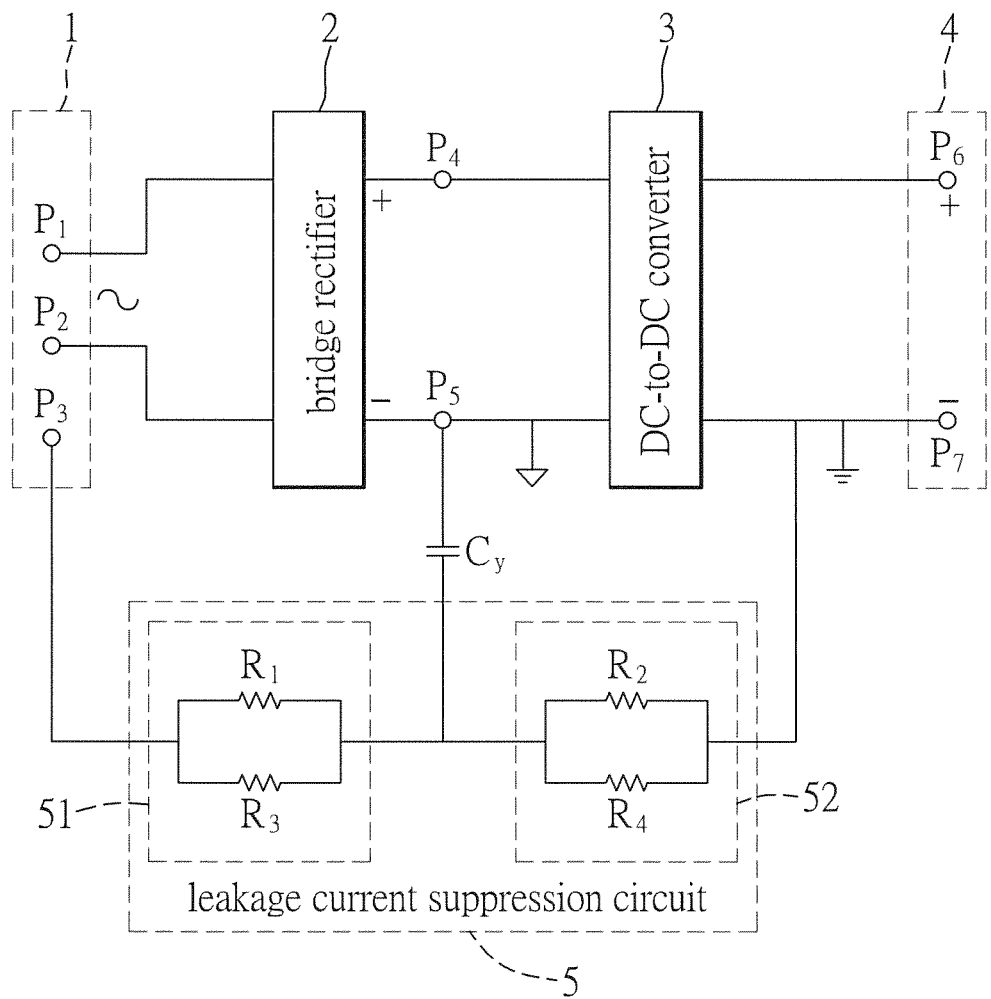
FIG. 5 is a schematic circuit block diagram illustrating the third embodiment of an AC-to-DC power supply according to the disclosure.

FIG. 5 illustrates the third embodiment of an AC-to-DC power supply 10 according to this disclosure, which is a modification of the first embodiment. Unlike the first embodiment, the first impedance unit 51 has two resistors ($R_1$, $R_3$) coupled in parallel to each other, and the second impedance unit 52 has two resistors ($R_2$, $R_4$) coupled in parallel to each other.

Figure 6:
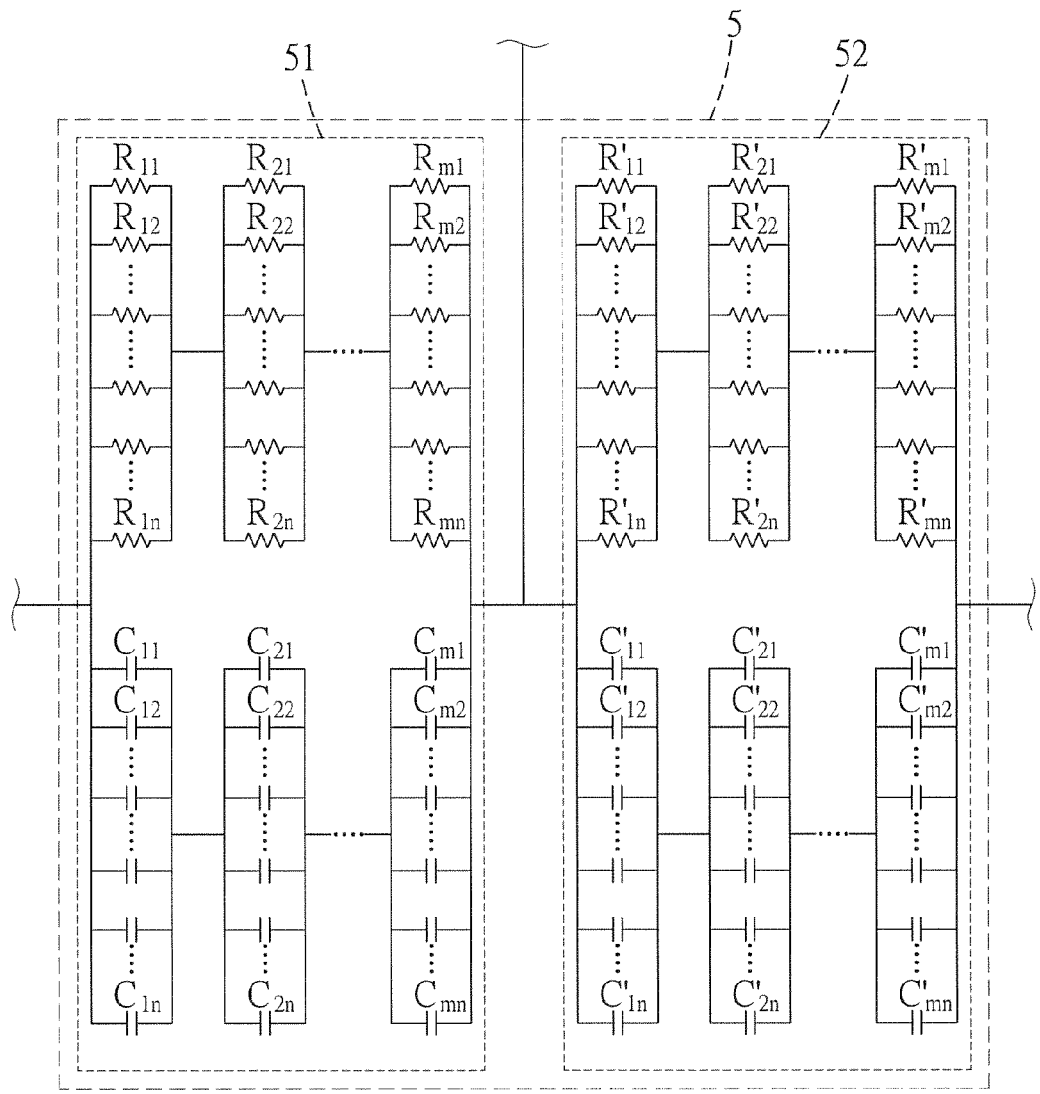
FIG. 6 is a schematic electrical circuit diagram illustrating a leakage current suppression circuit of the fourth embodiment of an AC-to-DC power supply according to the disclosure.

FIG. 6 illustrates a leakage current suppression circuit 5 of the fourth embodiment of an AC-to-DC power supply according to this disclosure, which is a modification of the first embodiment.

In this embodiment, for the leakage current suppression circuit 5, the first impedance unit 51 includes a first resistor unit and a first capacitor unit coupled in parallel to the first resistor unit. The first resistor unit includes a plurality of resistors ($R_{11}$, $R_{12}$, ..., $R_{1n}$, $R_{21}$, ..., $R_{mn}$), wherein the resistors ($R_{i1}$, $R_{i2}$, ..., $R_{in}$) are coupled in parallel to each other to form an $i^{th}$ parallel-connected first resistor structure, where i, n and m are positive integers, and $1 \leq i \leq m$, and the number (m) of the parallel-connected first resistor structures are connected in series to each other. The first capacitor unit includes a plurality of capacitors ($C_{11}$, $C_{12}$, ..., $C_{1n}$, $C_{21}$, ..., $C_{mn}$), wherein the capacitors ($C_{j1}$, $C_{j2}$, ..., $C_{jn}$) are coupled in parallel to each other to form a $j^{th}$ parallel-connected first capacitor structure, where j is a positive integer, and $1 \leq j \leq m$, and the number (m) of the parallel-connected first capacitor structures are connected in series to each other. It is noted that in another variation of this embodiment, the number of the resistors of the first resistor unit is not necessarily equal to the number of the capacitors of the first capacitor unit.

Similar to the first impedance unit 51, the second impedance unit 52 includes a second resistor unit and a second capacitor unit coupled in parallel to the second resistor unit. The second resistor unit includes a plurality of resistors ($R'_{11}$, $R'_{12}$, ..., $R'_{1n}$, $R'_{21}$, ..., $R'_{mn}$), wherein the resistors ($R'_{p1}$, $R'_{p2}$, ..., $R'_{pn}$) are coupled in parallel to each other to form an $p^{th}$ parallel-connected second resistor structure, where p is a positive integer, and $1 \leq p \leq m$, and the number (m) of the parallel-connected second resistor structures are connected in series to each other. The second capacitor unit includes a plurality of capacitors ($C'_{11}$, $C'_{12}$, ..., $C'_{1n}$, $C'_{21}$, ..., $C'_{mn}$), wherein the capacitors ($C'_{q1}$, $C'_{q2}$, ..., $C'_{qn}$) are coupled in parallel to each other to form a $q^{th}$ parallel-connected second capacitor structure, where q is a positive integer, and $1 \leq q \leq m$, and the number (m) of the parallel-connected second capacitor structures are connected in series to each other. Similarly, in another variation of this embodiment, the number of the resistors of the second resistor unit is not necessarily equal to the number of the capacitors of the second capacitor unit.

To sum up, by appropriately designing the first and second impedance units 51, 52 of the leakage current suppression circuit 5, the AC-to-DC power supply 10 of this disclosure can effectively suppress the leakage current ($I_{lk}$) from the Y-type capacitor ($C_y$) in the measured leakage current ($I_m$) to comply with the leakage current criterion. On the other hand, due to the use of the leakage current suppression circuit 5, the choice of the Y-type capacitor ($C_y$) is more flexible so as to comply with various requirements for electromagnetic interference suppression.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A leakage current suppression circuit for an AC-to-DC power supply, the AC-to-DC power supply including an input unit, which includes a first input end and a second input end cooperatively receiving an AC input voltage, and a grounded third end, a bridge rectifier which is coupled to the first and second input ends of the input unit for receiving the AC input voltage therefrom, which converts the AC input voltage into a DC voltage and which outputs the DC voltage through a first output terminal and a grounded second output terminal thereof, a DC-to-DC converter which is coupled to the first and second output terminals of the bridge rectifier for receiving the DC voltage from the bridge rectifier, which converts the DC voltage into a predetermined DC output voltage and which outputs the predetermined DC output voltage through a first output end and a grounded second output end thereof, and a capacitor which has two terminals, one of the terminals coupled to the second output terminal of the bridge rectifier and an input end of the DC-to-DC converter, said leakage current suppression circuit comprising:
    a first impedance unit to be coupled between the other of the terminals of the capacitor and the third end of the input unit; and
    a second impedance unit to be coupled between the other of the terminals of the capacitor and the second output end of the DC-to-DC converter;
    wherein a current flowing through said second impedance unit decreases with increase of the ratio of an impedance of said second impedance unit to an impedance of said first impedance unit.

2. The leakage current suppression circuit as claimed in claim 1, wherein each of said first and second impedance units includes at least one resistor.

3. The leakage current suppression circuit as claimed in claim 1, wherein at least one of said first and second impedance units includes:
    a resistor unit that includes at least one resistor; and
    a capacitor unit that is coupled in parallel to said resistor unit and that includes at least one capacitor.

4. A leakage current suppression circuit for an AC-to-DC power supply, the AC-to-DC power supply including an input unit, which includes a first input end and a second input end cooperatively receiving an AC input voltage, and a grounded third end, a bridge rectifier which is coupled to the first and second input ends of the input unit for receiving the AC input voltage therefrom, which converts the AC input voltage into a DC voltage and which outputs the DC voltage through a first output terminal and a grounded second output terminal thereof, a DC-to-DC converter which is coupled to the first and second output terminals of the bridge rectifier for receiving the DC voltage from the bridge rectifier, which converts the DC voltage into a predetermined DC output voltage and which outputs the predetermined DC output voltage through a first output end and a grounded second output end thereof, and a capacitor which has two terminals, one of the terminals coupled to the second output terminal of the bridge rectifier, said leakage current suppression circuit comprising:
    a first impedance unit to be coupled between the other of the terminals of the capacitor and the third end of the input unit; and
    a second impedance unit to be coupled between the other of the terminals of the capacitor and the second output end of the DC-to-DC converter;
    wherein said second impedance unit has an impedance greater than that of said first impedance unit.

5. An AC-to-DC power supply comprising:
    an input unit including a first input end and a second input end that are cooperatively used to receive an AC input voltage, and a grounded third end;
    a bridge rectifier having a first input terminal and a second input terminal that are coupled respectively to said first and second input ends of said input unit for receiving the AC input voltage therefrom, a first output terminal and a grounded second output terminal, said bridge rectifier converting the AC input voltage into a DC voltage and outputting the DC voltage through said first and second output terminals;
    a DC-to-DC converter coupled to said first and second output terminals of said bridge rectifier for receiving the DC voltage from said bridge rectifier, said DC-to-DC converter having a first output end and a grounded second output end, converting the DC voltage into a predetermined DC output voltage, and outputting the predetermined DC output voltage through said first and second output ends;
    a capacitor having two terminals, one of the terminals coupled to said second output terminal of said bridge rectifier and an input end of the DC-to-DC converter; and
    a leakage current suppression circuit including:
        a first impedance unit coupled between the other of said terminals of said capacitor and said third end of said input unit, and
        a second impedance unit coupled between the other of said terminals of said capacitor and said second output end of said DC-to-DC converter;
        wherein a current flowing through said second impedance unit of said leakage current suppression circuit decreases with increase of the ratio of an impedance of said second impedance unit to an impedance of said first impedance unit.

6. The AC-to-DC power supply as claimed in claim 5, wherein each of said first and second impedance units of said leakage current suppression circuit includes at least one resistor.

7. The AC-to-DC power supply as claimed in claim 5, wherein at least one of said first and second impedance units of said leakage current suppression circuit includes:
    a resistor unit that includes at least one resistor; and
    a capacitor unit that is coupled in parallel to said resistor unit and that includes at least one capacitor.

8. The AC-to-DC power supply as claimed in claim 5, wherein said second impedance unit of said leakage current suppression circuit has an impedance greater than that of said first impedance unit.

\* \* \* \* \*